United States Patent [19]
Suzuki et al.

[11] 4,142,786
[45] Mar. 6, 1979

[54] LIQUID CRYSTAL DISPLAY DEVICE FOR A CAMERA

[75] Inventors: Ryoichi Suzuki, Kawasaki; Takashi Uchiyama; Seiichi Matsumoto, both of Yokohama; Takashi Amikura, Tokyo; Tokuichi Tsunekawa, Yokohama, all of Japan

[73] Assignee: Canon Kabushiki Kaisha, Tokyo, Japan

[21] Appl. No.: 832,009

[22] Filed: Sep. 9, 1977

[30] Foreign Application Priority Data
Sep. 9, 1976 [JP] Japan .................... 51-108297

[51] Int. Cl.² .................. G03B 15/05; G03B 17/20
[52] U.S. Cl. ........................... 354/32; 354/50; 354/53; 354/127
[58] Field of Search .................. 354/32–35, 354/50, 51, 53–55, 60 R, 60 E, 60 L, 60 F, 126–128, 145, 219, 224, 225; 350/332, 333, 336, 345; 340/221, 248 A; 352/170, 171

[56] References Cited
U.S. PATENT DOCUMENTS

| | | | |
|---|---|---|---|
| 3,727,527 | 4/1973 | Borowski et al. | 354/53 |
| 3,821,765 | 6/1974 | Wagner et al. | 354/128 |
| 3,828,644 | 8/1974 | Uchida | 354/54 |
| 3,950,775 | 4/1976 | Toyama et al. | 352/171 X |
| 3,967,288 | 6/1976 | Yamamoto | 354/60 L |
| 3,978,499 | 8/1976 | Nagaoka et al. | 354/60 L |
| 3,994,564 | 11/1976 | Somogyi | 350/345 |

FOREIGN PATENT DOCUMENTS
1354225 5/1974 United Kingdom ............... 354/60 E

Primary Examiner—L. T. Hix
Assistant Examiner—William B. Perkey
Attorney, Agent, or Firm—Toren, McGeady and Stanger

[57] ABSTRACT

A liquid crystal display device for a camera, so designed to be illuminated by means of the artificial light so that the display value can clearly be observed, even when the photographic atmosphere is dark.

8 Claims, 19 Drawing Figures

FIG.1
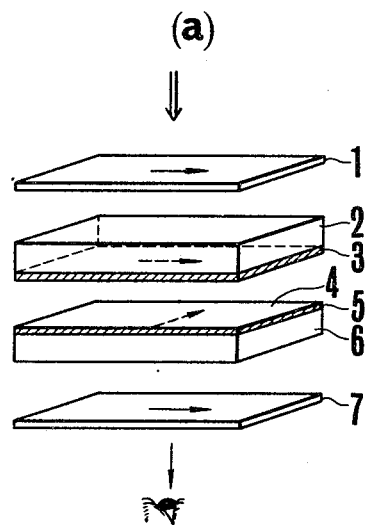
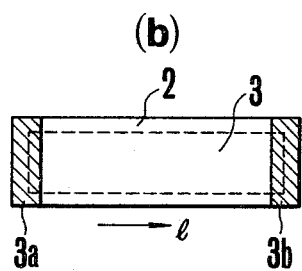
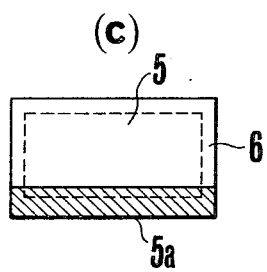
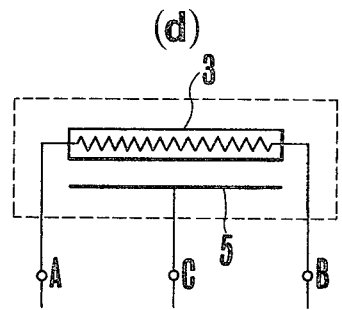
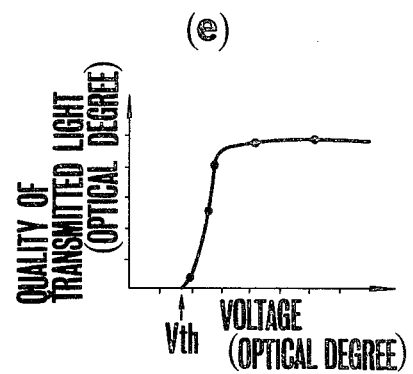
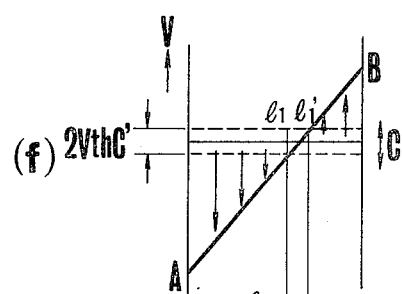
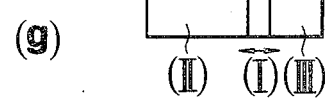

FIG. 7
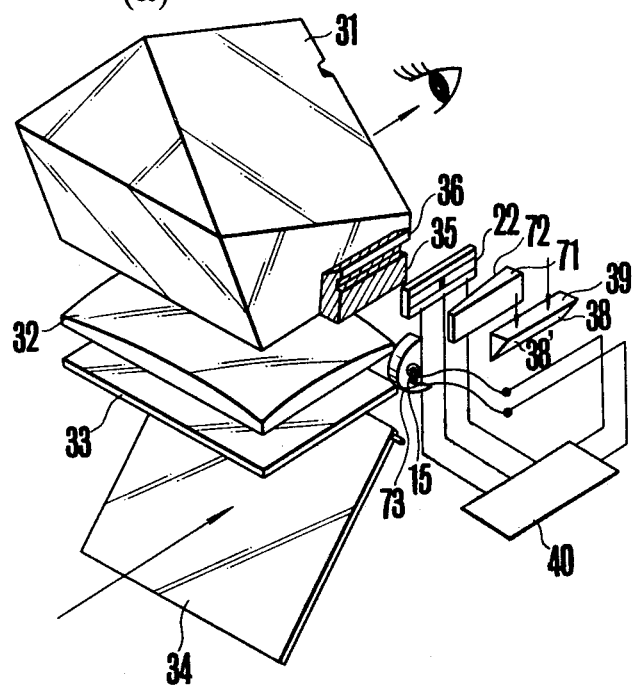
(a)
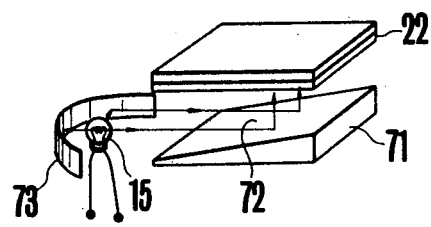
(b)

LIQUID CRYSTAL DISPLAY DEVICE FOR A CAMERA

BACKGROUND OF THE INVENTION

1. Field of the Invention

The present invention relates to a liquid crystal display device for a camera, particularly for displaying the photographic informations such as the shutter time and so on.

2. Description of the Prior Art

In case of a camera various kinds of informations such as of the shutter time, the aperture value, that photographic distance and the depth of the photographic field and further the alarms for the battery consumption, the over and the under exposure, the limit for the hand holding and so on are displayed.

Recently a device incorporated with a liquid crystal cell has been proposed as display device. Although the liquid crystal cell has such a merit that it is nearly free from damage, having no mechanical movable members, it is difficult to consider the display in a dark place, because the cell itself does not issue light. Further in case of the liquid crystal cell of the field effect type, polarizers are needed for obtaining the display, whereby the light amount is largely reduced by the polarizers so that it is further difficult to observe the displayed value in the liquid crystal cell. Thus the display device incorporated with conventional liquid crystal cell is inconvenient as the display device for a camera which is used also in a dark place.

SUMMARY OF THE PRESENT INVENTION

A purpose of the present invention is to offer a liquid crystal display device suited for a camera.

Another purpose of the present invention is to offer a liquid crystal display device for a camera, so designed to be illuminated by means of the artificial light so that the display value can clearly be observed, even when the photographic atmosphere is dark.

Further another purpose of the present invention is to offer a liquid crystal display device for a camera presenting optical systems for uniformly illuminating the liquid crystal cell by means of the artificial light evenly.

Further, another purpose of the present invention is to offer a liquid crystal display device for a camera for illuminating the liquid crystal cell by means of the artificial light so as to give the hand holding limit alarm when the shutter time is longer than the limit time for the hand holding.

Further, another purpose of the present invention is to offer a liquid crystal display device for a camera for illuminating the liquid crystal cell by means of the artificial light for showing that the flash light photography is possible when the speed light device has been prepared for operation.

The above and other objects, features and advantages of the present invention will become more apparent from the following description of same embodiments thereof taken into conjunction with the accompanying drawings.

BRIEF DESCRIPTION OF THE DRAWINGS

FIG. 1(a) shows the composition of an embodiment of a liquid crystal cell applicable to the present invention.

FIG. 1(b) shows the base plate 2 in FIG. 1(a) in plane view.

FIG. 1(c) shows the base plate 6 in FIG. 1(a) in plane view.

FIG. 1(d) shows a sketch of the liquid crystal cell shown in FIG. 1(a).

FIG. 1(e) shows a diagram for explaining the electro-optical characteristics of the liquid crystal cell.

FIG. 1(f) shows a diagram for showing the potential distribution in the liquid crystal cell.

FIG. 1(g) shows a diagram for explaining the display state of the liquid crystal cell.

FIG. 7(a) shows further another arrangement of the liquid crystal cell and the lamp with reference to the camera in perspective view.

FIG. 7(b) shows the important part of the optical system shown in FIG. 7(a) in perspective view.

DESCRIPTION OF THE EMBODIMENTS

Figure 2:
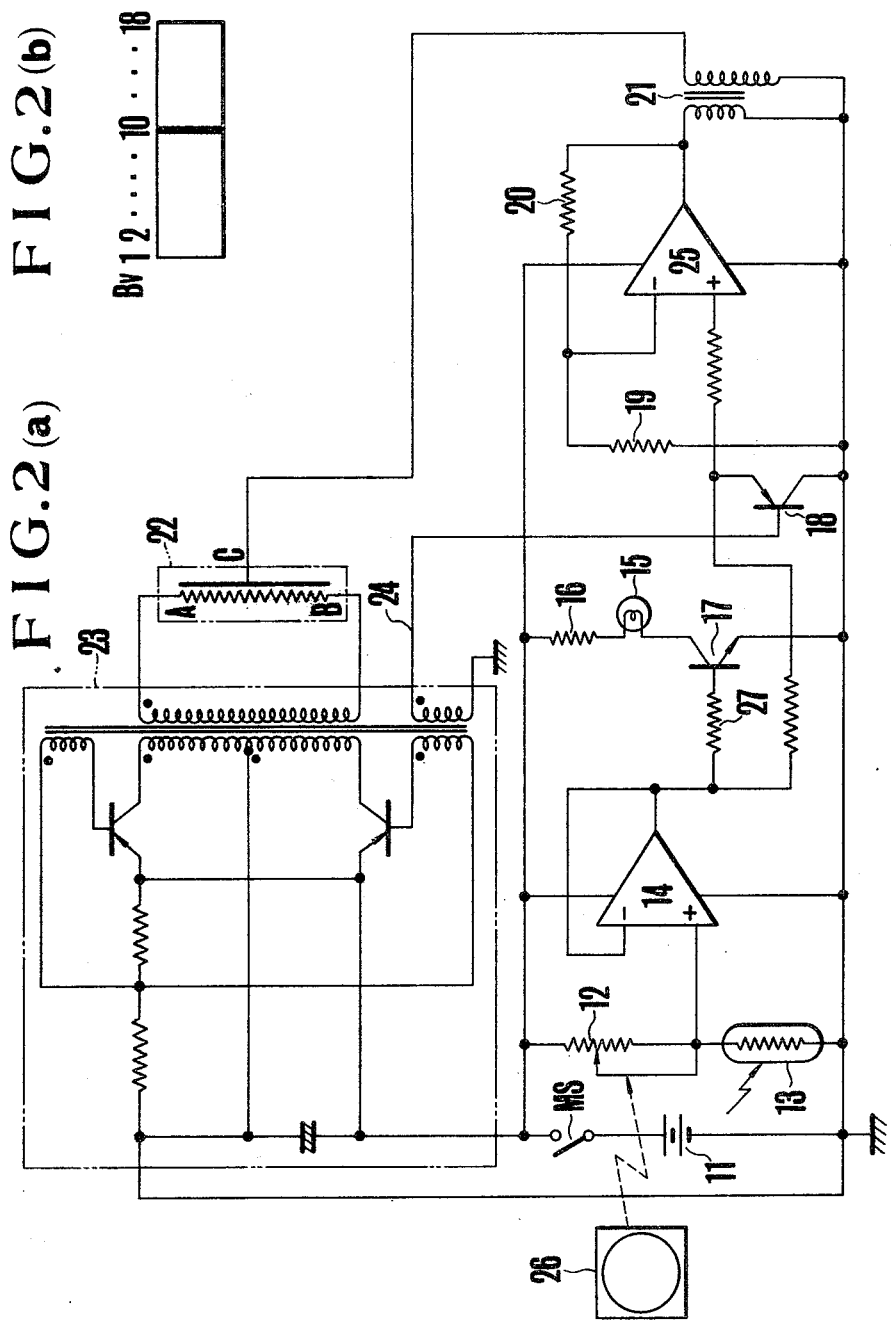
FIG. 2(a) shows an embodiment of the circuit of the liquid crystal display device for a camera in which the liquid crystal cell shown in FIG. 1 is used in accordance with the present invention.
FIG. 2(b) shows a diagram for showing the display state of the liquid crystal cell.

Below the liquid crystal display device in accordance with the present invention will be explained in detail.

FIG. 1 shows the composition of an embodiment of the liquid crystal cell applicable to the present invention and a sketch for explaining the operation of the cell, whereby FIG. 1(a) shows the composition of the liquid crystal cell. In the drawing, 1 is the first polarizer, 2 the first base plate, 3 the transparent resistance electrode formed on the base plate 2, 4 the space filled with nematic liquid crystal presenting a field effect, 6 the second base plate, 5 the transparent conductive electrode formed on the base plate 6 and 7 the second polarizer. The liquid crystal cell shown in the drawing is of the transparent type. When the liquid crystal cell of the reflection type is used, the dispersion reflection plate is to be provided behind the polarizer 7. FIG. 1(b) shows the base plate 2 in plane view, on which base plate a resistance electrode 3 is formed in such a manner that at least in two territories separated from each other well conductive electrodes (terminal electrodes) 3a and 3b are formed. FIG. 1(c) shows the base plate 6 in plane view, on which base plate a transparent conductive electrode 5 is formed, presenting at least one well conductive electrode (terminal electrode) 5a. Hereby the transparent resistance electrode 3 has a sufficiently high resistance value in comparison with the transparent resistance electrode 5. The liquid crystal cell is so constituted that the two base plates 3 and 5 are arranged in parallel to each other with a distance of 4μ–50μ from each other, whereby a nematic liquid crystal presenting a field effect is sandwitched between the two base plates in such a manner that the terminal electrodes are connectable to the external circuit. FIG. 1(d) shows a sketch of the liquid crystal, whereby 3 is the resistance electrode on the base 2 plates, while 5 is the conductive electrode on the base plate 6.

The arrow on the polarizer 1 shows the polarization plane of the polarizer, the arrow in a dotted line on the resistance electrode 3 the orientation direction of the liquid crystal molecules on the resistance electrode plane and the arrow on 5 shows the orientation direction of the liquid crystal molecules on the conductive electrode plane 5 opposed to the resistance electrode 3, whereby the molecules of the liquid crystal filled between these two electrodes are arranged distorted little by little within the angle between the two arrows in a dotted line. The arrow on the polarizer 7 shows the polarization plane of the polarizer. This polarizer 7 serves to detect the light beam coming out of the liquid crystal cell. In FIG. 1(a) the orientation of the molecules of the liquid crystal in distorted by 90°. In the drawing, the light beam Io incident from above is polarized in accordance with the polarization plane of the polarizer 1 and distorted in the polarization by an angle corresponding to the distorted angle of the molecules of the liquid crystal while the light beam Io travels through the liquid crystal layer between the resistance electrode 3 and the conductive electrode 5 before reaching the second polarizer 7. If now the angle between the polarization of the light beam and the polarization of the polarizer is 90°, the incident light beam Io is interrupted in such a manner that only a dark state is observed from below. When an electrical field higher than a certain determined value is applied to the liquid crystal cell, the molecules of the liquid crystal cell are oriented in such a manner that the major axis is perpendicular to the plane of the substrate, whereby the liquid crystal is isotropic with respect to the incident light beam Io so that the light beam is not further polarized. In consequence, when the polarization direction of the two polarizers are parallel to each other the light beam passes through when the electrical field is applied, in such a manner that a bright state is observed contrary to the case no electrical field is applied FIG. 1(e) shows the sketch for explaining the electro-optical characteristics of the liquid crystal cell, whereby the abscissa indicates the voltage, the ordinate the amount of transmitted light beam and Vth the threshold value. The drawing shows the characteristics when a twisted nematic field effect mode liquid crystal TN-FEM cell is used. In a TN-FEM cell, the voltage Vth is as low as about 1 to 3 volts. In the field effect mode liquid crystal display cell of the deformation of vertically aligned nematic liquid crystal phase type (DAP-FEM cell), the voltage Vth is about 3 to 6 volts. Thus, as compared with the DSM cell utilizing DSM, both of these two cells have sufficiently low threshold voltage values. The FEM type liquid crystal display cells inhibiting the low threshold characteristic further include those modified from the TN-FEM type or DAP-FEM type. Any of these liquid crystal display cells having low threshold characteristics may be employed as the liquid crystal cell of the present invention. It is particularly effective to employ a TN-FEM cell which has the lowest threshold characteristic in liquid crystal cells of all known types.

The liquid crystal cell constituted as mentioned above and applicable to the present invention is basically driven in such a manner that a potential distribution is given to the resistance electrode 3 as is shown in FIG. 1(d), that a voltage is applied so as to produce a potential difference between the resistance electrode 3 and the conductive electrode 5 and that a potential difference distribution is given by varying the potential difference between the resistance electrode 3 and the conductive electrode 5 so that a voltage so adjusted as to obtain an intended display in the potential difference territory not exceeding the electro-optical threshold value of the liquid crystal within the above potential differnce distribution is given. FIG. 1(f) shows the change in voltage V along the length (l) of the resistance electrode 3 for a potential applied across terminals A and B. On the other hand, when 5 in FIG. 1(d) consists of a conductive electrode whose resistance is sufficiently low in comparison with the resistance electrode 3, the voltage applied to 5 does not change in accordance with the position of l so that CC' is shown by a horizontal straight line. Consequently the voltage distribution produced in the crystal cell is between the straight line AB and the straight line CC'. The electro-optical characteristic of the liquid crystal display cell used in the present invention lacks polarity (or directionality). If the width of ± Vth is considered with the straight line CC' as its center, the threshold voltage of the cell is 2 Vth. Hence, in the band-like area of 2 Vth, no electrooptical modulation takes place within the area 1-1' indicated by the arrow representative of the potential difference. FIG. 1(g) shows the display in such a case, whereby the overall rectangle shows the total display range while the nonmodulated range (I) corresponding to $l_1$ and $l'_1$ shows the display part.

In the liquid crystal cell used in the invention, it is possible to provide a display appearing like a dot or a line by sufficiently increasing the area (II) (III) (FIG. 1 (g)) in which the threshold voltage of the liquid crystal display cell is exceeded with respect to the area (I) in which the threshold voltage is not exceeded. More particulary, the liquid crystal cell used in the present invention can effect an infinitely varying unstepped display at any desired position within the entire display are by varying the potential gradient between A and B (represented by the gradient of the straight line AB) or by varying the potential level of C (represented by the vertical displacement of the straight line CC'.

Further, the cell of the present invention is arranged to make a display action in the following manner: As shown in FIG. 1(f), the difference between the potential CC' of the layer 5 and the potential AB of the layer 3 causes only the area of liquid crystal that has a potential higher or lower than the potential of the layer 5 at least by Vth to allow an incident light to pass through there; and, therefore, as shown by I in FIG. 1(g), it is only the liquid crystal area corresponding to the potential impressed on the terminal C that becomes opaque to make display by a pointer. Thus, the potential impressed on the terminal C alone is displayed on the display surface (FIG. 1(g)) by a pointer as function of position.

The liquid crystal cell is constituted and driven in this way, whereby the information is displayed in an analog way (lineary). Hereby in case of the liquid crystal cell of the field effect type polarizers are essential either for the display method with penetrating type or for the display method with reflection type. However the light amount is largely absorbed in the polarizers. In consequence, in case a display device having a liquid crystal cell is built in a camera to be used in rooms or dark places, it is often difficult to read out the display only with the light from outside. It goes without saying that not only in case of the liquid crystal cell with TN effect but also in case of the liquid crystal cell with DSM effect it is hard to read out the display in a dark place.

FIG. 2(a) shows an embodiment of the circuit of the liquid crystal display device for a camera in which the liquid crystal cell shown in FIG. 1 is used in accordance with the present invention. In the drawing, 11 is the power source, 13 is the light sensing element consisting of CdS, serving to carry out the TTL light measurement with totally opened diaphragm. 12 is the voltage dividing resistance. 14 is the operational amplifier, constituting a buffer circuit, applying a no load feed back between the inversing input terminal and the output terminal. 15 is a lamp provided near the display means as an illumination means. 16 is a resistance for limiting the current running through the lamp. 17 is the transistor being connected in series with the lamp so as to constitute a switching means. 25 is an operational amplifier, constituting a non-inversing amplifier with the resistances 19 and 20. 18 is the transistor being connected in parallel to the non-inversing input terminal of the operational amplifier 25. 21 is the transformer connected to the output terminal of the operational amplifier 25.

The circuit in a dotted line 23 is a DC-AC inverter. 22 is the liquid crystal cell being provided in the view finder optical system so as to produce a display by making use of a part of a light from the object to be photographed, whereby the output voltage of the inverter 22 is applied on the resistance electrode between A and B while the output of the transformer 21 is applied on the homogeneous electrode opposite to the resistance electrode through the liquid crystal so as to drive the display means. 26 is the smallest F value transmitting means being operatively engaged with a variable resistance 12. Namely it serves to compensate the change of the brightness level of the liquid crystal cell 22 due to the smallest F value of the photographic lens when the lamp 15 is put on, whereby it is not necessary for the external light measuring method for which the light sensing element is provided outsides.

Figure 3:
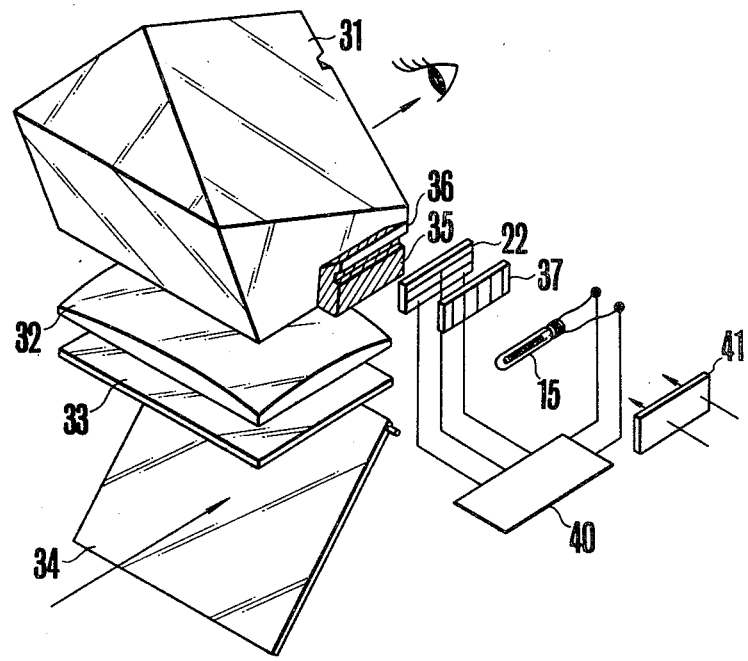
FIG. 3 shows an arrangement of the liquid crystal cell shown in FIG. 2(a) and the lamp with reference to the camera in perspective view.

FIG. 3 shows an arrangement of the liquid crystal cell shown in FIG. 1(a) and the lamp 15 with reference to the camera in perspective view. In the drawing, 31 is the pentagonal prism. 32 is the condenser lens, 33 is the focusing plate, 34 is a prism serving to lead the information coming through the plane 36 into the view finder. 22 is the afore mentioned liquid crystal cell. 15 is the afore mentioned lamp. 37 is the dispersion plate serving to homogenize the lamp light for illuminating the liquid crystal cell 22. 40 is the driving circuit shown in FIG. 2(a) serving to drive the liquid crystal cell 22 and the lamp. 41 is the light intaking window, whereby the liquid crystal cell is illuminated by means of the light coming through the window when the camera is in a bright atmosphere.

Figure 4:
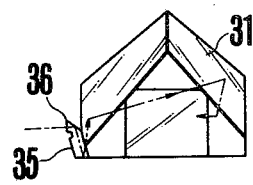
FIG. 4 shows the pentagonal prism as well as the prism in FIG. 3 seen from the behind.

FIG. 4 shows the pentagonal prism 31 as well as the prism 35 shown in FIG. 3 seen from the behind, whereby the information introduced through the plane 36 is displayed in the view finder, being reflected as is shown by the arrow.

Below the operation of the liquid crystal display device for a camera shown in FIG. 2(a), 3 and 4 in accordance with the present invention will be explained in detail.

By closing the main switch MS, a voltage is applied to the voltage dividing circuit consisting of a resistance 12 and CdS 13 so as to produce an output voltage at the output terminals of the voltage dividing circuit. As mentioned afore the smallest F value information is set on the resistance 12 while the light beam coming through the lens with the smallest F value is reading CdS 13 so that the output voltage of the voltage dividing circuit assumes the value corresponding to the Bv value. In consequence the voltage is transmitted to the non inversing input terminal of the operational amplifier 25 through the buffer circuit. Consequently, at the output terminals of the amplifier 25, an output voltage amplified by the ratio of the resistance 19 to the resistance 20 is produced. On the other hand, the DC-AC inverter 23 is in operation since the main switch has been closed while another trap 24 is provided at the output terminals of the inverter 23 in such a manner that the transistor 18 is brought into and out of the switched on state by means of the output voltage. Consequently at the output terminals of the transformer 21 an alternating voltage synchronized with the alternating output voltage of the inverter 23 is produced, while as afore mentioned the output voltage of the operational amplifier 25 assumes the value corresponding to the Bv value so that the alternating voltage applied to the C electrode of the liquid crystal cell 22 assumes the value corresponding to the value Bv in such a manner that by means of the afore explained operation of the liquid crystal cell a linear indication is displayed at the position corresponding to the value Bv on the plane of the cell so as to display the value Bv as is shown in FIG. 2(b). Further the linear indication as well as the figure of the value Bv displayed by the liquid crystal cell is illuminated by means of the light introduced through the light intaking window 41, whereby the image of the linear indication and the figure of the value Bv by the liquid crystal cell reach the plane of the prism 35 and reflected as is shown by the arrow in FIG. 4 so as to be displayed in the view finder. When the photographic atmosphere is bright the cell is illuminated by means of the light from outside in this way so as to display the value Bv, while when the atmosphere is dark the brightness lowers so that the resistance value of CdS 13 goes up, whereby the output voltage of the operational amplifier 14 goes up to a value higher than a certain determined value so that the transistor 17 is brought into the switched on state and the lamp 15 is put on so as to illuminate the liquid crystal cell. Hereby the resistance 27 is so adjusted that the level at which the lamp starts to light up coincides with the time point at which it becomes hard to observe the display in the view finder. When the lamp 15 lights up in this way, the light beam of the lamp 15 is dispersed by means of the dispersing plate 37 so as to illuminate the plane of the liquid crystal cell 22 evenly. Consequently, in the same way as in the afore mentioned case of the daylight the display image is introduced into the view finder by means of the prisms 35 and 31 in such a manner that even when the photographic atmosphere is dark, the whole liquid crystal is illuminated evenly so as to display the information of the value Bv clarly. In FIG. 3 a long lamp 15 is used and arranged in parallel to the plane of the dispersion plate so that the liquid crystal cell is illuminated evenly.

Figure 5:
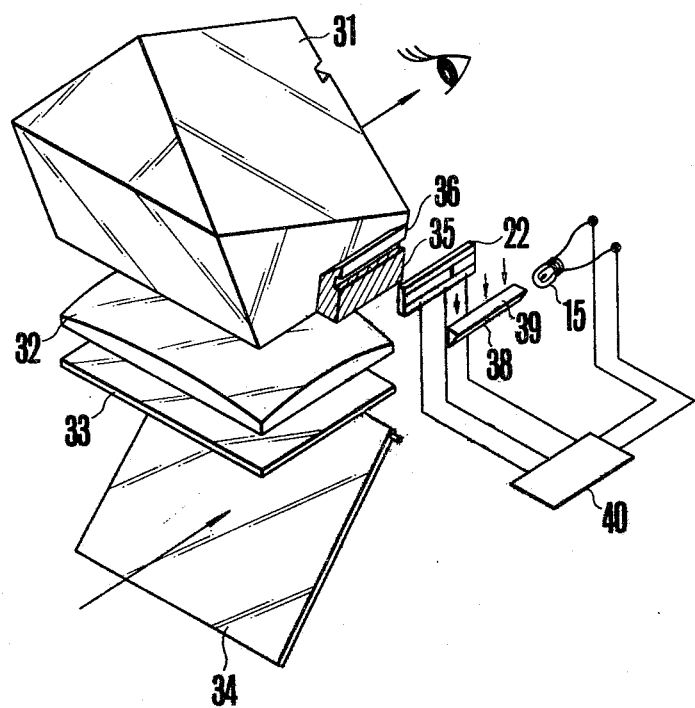
FIG. 5 shows another arrangement of the liquid crystal cell and the lamp with reference to the camera in perspective view.

FIG. 5 shows another arrangement of the liquid crystal cell and the lamp with reference to the camera in perspective view, whereby the same members as those in the embodiment shown in FIG. 3 bear the same figures. In the present embodiment, a prism 38 is provided instead of the light intaking window 41 and the dispersion plate 37, whereby the upper surface of the prism 38 serves as the light intaking window 41, in such a manner that when the photographic atmosphere is bright the light beam introduced through the upper surface of the prism 38 is reflected by the inclined plane of the prism so as to illuminate the liquid crystal cell, while when the photographic atmosphere is dark, the lamp provided beside the prism is put on in the afore mentioned way, whereby the light beam of the lamp is introduced through the end plane of the prism so as to illuminate the liquid crystal cell in the same way as in case of daylight. In case of FIG. 5 the light beam of the lamp is introduced through the end plane of the prism in this way so that the prism itself acts as a long light source like the lamp shown in FIG. 3 so as to illuminate the liquid crystal cell evenly.

Figure 6:
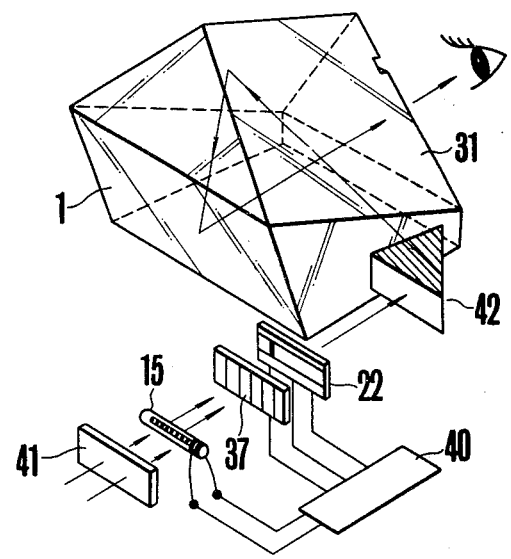
FIG. 6 shows further another arrangement of the liquid crystal cell and the lamp with reference to the camera in perspective view.

FIG. 6 shows further another arrangement of the liquid crystal cell and the lamp shown in FIG. 3 with reference to the camera in perspective view, whereby the same members as those in the embodiment shown in FIG. 3 bear the same figures. In the present embodiment instead of the prism 35 a triangle prism is fixed on a side plane of the pentagonal prism 31. By arranging the triangle prism in this way, the image light beam incident upon the pentagonal prism 31 is reflected only two times in the pentagonal prism as is shown by the arrow in the drawing in order to obtain a display in the view finder, whereby the number of reflections is so small that the brightness of the image is not decreased and therefore a clear display can be obtained, which is quite profitable as the display optical system of liquid crystal cell. Further it is possible to obtain an image display in an efficient way when the upper surface of the prism 42 is constituted as mirror.

FIG. 7(a) and FIG. 7(b) show further another arrangement of the liquid crystal cell and the lamp with reference to the camera and of the optical system in perspective view, whereby the same member as those of the embodiment shown in FIG. 5 bear the same figures. In the present embodiment a parabolical reflector 73 is provided for the lamp 15 so as to reflect the light beam from the lamp into a parallel light beam to be led to the half permeable mirror of the reflecting mirror 71 with a half permeable mirror plane 72 in such a manner that the liquid crystal cell is illuminated. Hereby even in the present embodiment, when the photographic atmosphere is bright, the daylight introduced through the upper surface of the triangle prism 38 is reflected on the mirror plane 38' and reaches the liquid crystal cell plane through the prism in such a manner that the information is displayed as in case of the embodiment shown in FIG. 5.

Figure 8:
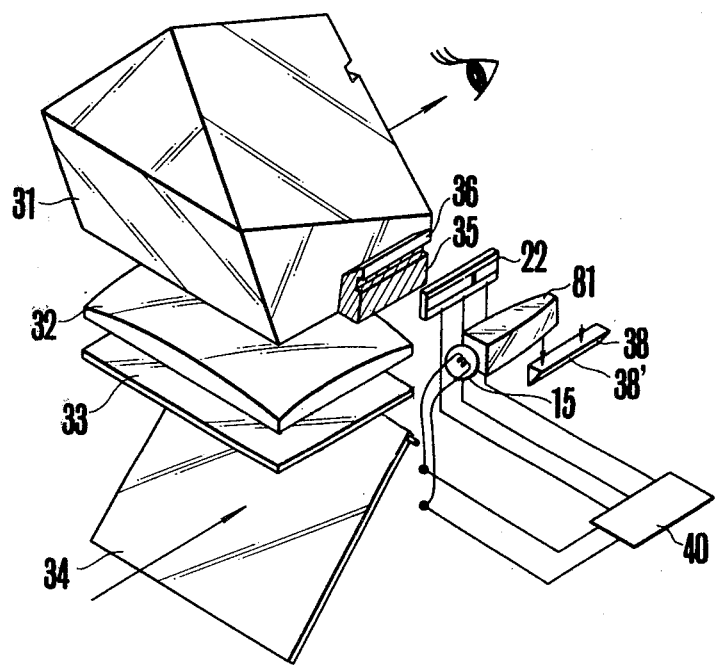
FIG. 8(a) shows further another arrangement of the liquid crystal cell and the lamp with reference to the camera in perspective view.
FIG. 8(b) shows the important part of the optical system shown in FIG. 8(a).
FIG. 8(c) shows another embodiment of the optical system shown in FIG. 8(b).
Figure 8:
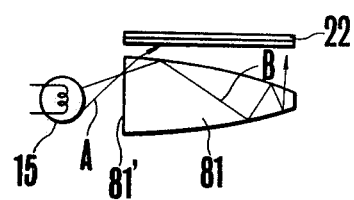
Figure 8:
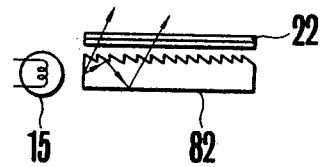

FIG. 8(a) shows further another arrangement of the liquid crystal cell and the lamp with reference to the camera in perspective view, whereby the same member as those of the embodiment shown in FIG. 5 bear the same figure. In the present embodiment, the light beam from the lamp 15 reach the end surface of the convex lens 81, whereby as is shown in FIG. 8(b), the light beam A from the lamp 15 enters into the lens with an angle larger than totally reflecting angle of the lens 81 so that the light beam A travels through the lens 81 so as to illuminate the liquid crystal cell, while the light beam like B entering into the end surface of the lens 81 with an acute angle, namely an angle smaller than the totally reflecting angle is reflected in the lens 81 several times until the angle becomes larger than the totally reflecting angle, when the light beam goes out of the lens 81, so as to illuminate the liquid crystal cell. Hereby the most part of the light beam from the lamp 15 enters into the lens 81 with an acute angle so that the more distant the spot to be reached by the light beam is from the end surface of the lens 81, the more light beam from the lamp 15 is condensed, namely the density of the light beam from the lamp 15 becomes larger. On the other hand, more distant the light beam from the lamp 15 travels through the lens 81 from the end surface of the lens 81, the more often the light beam is reflected in the lens 81 so that as the result the light beam from the lens 81 reaches the convex plane of the lens 81 evenly so as to illuminate the liquid crystal cell evenly. In this way, in case of the present embodiment, it becomes possible to illuminate the liquid crystal cell evenly by providing a lens with convex surfaces on both sides. Hereby, if the end surface 81' of the lens 81 is matt finished, the light beam from the lamp 15 is dispersed in every direction so that the liquid crystal cell can be illuminated more evenly.

FIG. 8(c) shows further another embodiment, in which a Fresnel lens 82 is provided instead of a convex lens 81. In this way it is also possible to obtain an even illumination by means of a Fresnel lens instead of a convex lens. Further, in case of the illumination by means of the daylight, the liquid crystal cell is illuminated in the same way as in case of the embodiment shown in FIG. 5. The liquid crystal cell is illuminated evenly in this way in the present embodiment, whereby further as the result of the present embodiment in case of the illuminating by means of the daylight the light beam coming through the triangle prism 38 penetrate the convex lens 81 and reaches the pentagonal prism so that the light beam of the image in the view finder is more condensed toward the center and therefore the image can be observed more brightly. Although in the present embodiment a convex lens and a Fresnel lens are used, the same effect can be obtained by means of a cylindrical lens.

Figure 9:
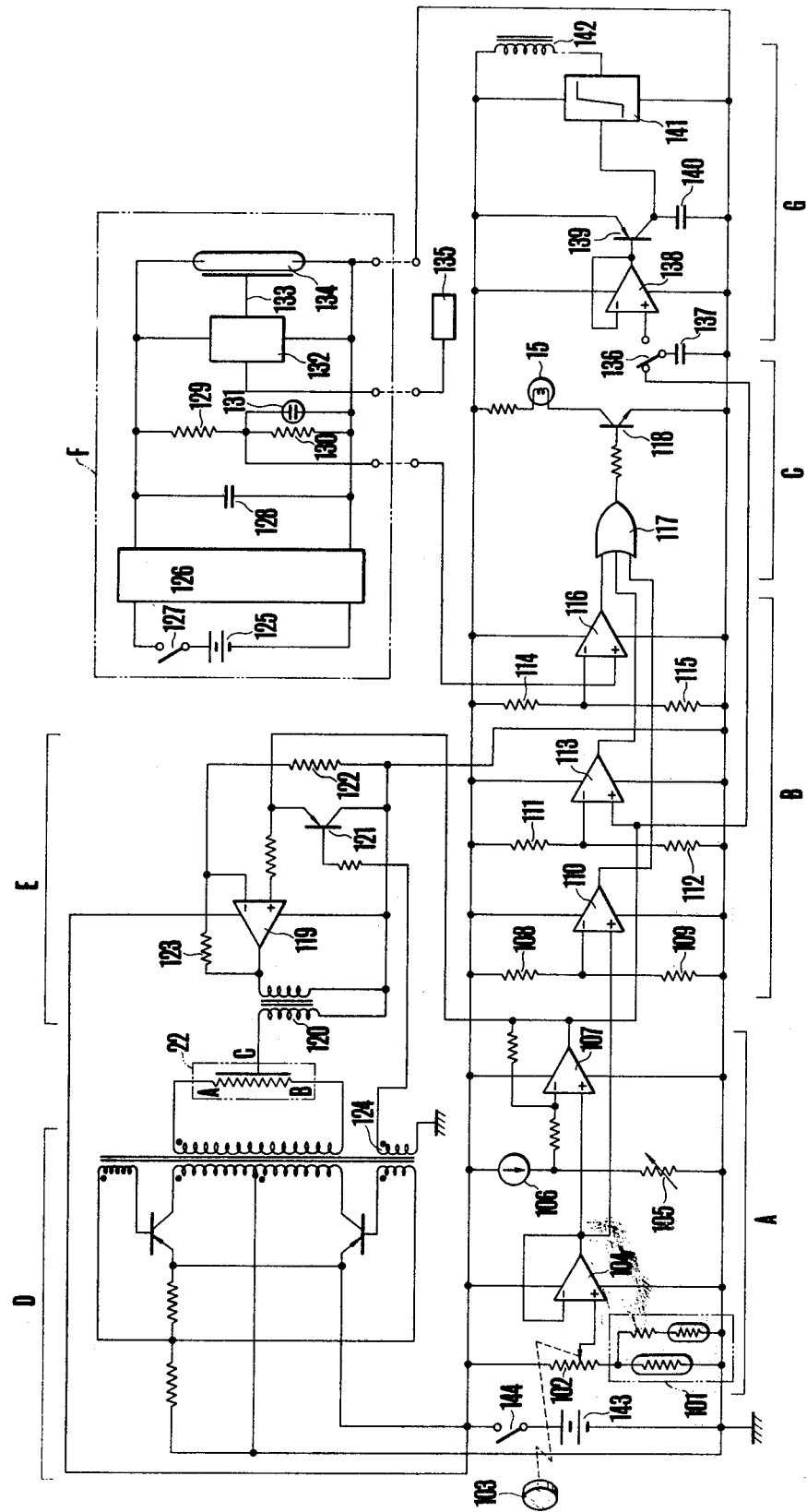
FIG. 9 shows another embodiment of the control circuit for the liquid crystal display device for a camera in accordance with the present invention.

FIG. 9 shows another embodiment of the control circuit for the liquid crystal display device for a camera in accordance with the present invention. In the drawing, A is the light measuring calculating circuit, consisting of a three terminal CdS for the TTL light measurement with the totally opened diaphragm, a variable resistance 102 operatively engaged with the smallest F value transmitting means so as to be set at the smallest F value of the lens, an operational amplifier 104 constituting a buffer circuit whose non inversing input terminal is connected to the variable resistance 102, a variable resistance 105 for setting the information of the film sensitivity and of the preset aperture value, a constant current source 106 and an operational amplifier 107 whose non inverting input terminal is connected to the out-put terminal of the buffer circuit 104 and whose inverting input terminal is connected to the output terminal of a series circuit consisting of the constant current source and of the resistance 105. B is the level comparison circuit, consisting of a voltage dividing circuit composed of resistances 108 and 109 for determining the lamp lighting level when the brightness is low, a comparator whose inverting input terminal is connected to the output terminal of the voltage dividing circuit and whose non inverting input terminal is connected to the output terminal of the buffer circuit 104, a voltage dividing circuit composed of resistances 111 and 112 for determining the lamp lighting level to show the hand holding limit, a comparator whose one input terminal is connected to the voltage dividing circuit and whose other input terminal is connected to the amplifier 107, a voltage dividing circuit composed of resistances 114 and 115 for determining the lamp lighting level when the speed light device has been charged and a comparator 116 whose one input terminal is connected to the output terminal of the voltage dividing circuit and whose other input terminal is connected to the speed light device circuit to be explained later.

C is the lamp driving circuit, consisting of an OR gate 117 whose input terminal is connected to the output terminals of the comparators 110, 113 and 116, a transistor 118 whose base is connected to the output of the OR gate 117 and whose collector is connected to the lamp 15 for illuminating the liquid crystal. D is the DC-AC inverter. E is the control signal forming circuit, consisting of an operational amplifier 119 whose non inverting input terminal is connected to the output terminal of the amplifier 107 and whose inverting input terminal and output terminal are connected to a resistance 123, a resistance 122 connected in series with the resistance 123, a transistor 121 whose base is connected to the secondary coil 124 of the inverter circuit D and whose emitter is connected to the non inversing input terminal of the amplifier 119, a transformer 120 for stepping up the output of the amplifier 119 and a liquid crystal cell 22 whose conductive electrode C (control electrode) is connected to the transformer 120 and whose resistance electrodes A and B are connected to the output terminals of the inverter circuit D. F is the speed light device circuit, consisting of a power source 125, a main switch 127, a step up circuit 126, a main condenser 128, resistances 129 and 130 for constituting a voltage dividing circuit for dividing the voltage at the output terminals of the main condenser, a charge completion display neon tube 131 connected in parallel to the resistance 130, a conventional trigger circuit 132 to be triggered by means of the synchronization switch 135 in the camera body so as to apply a trigger voltage to the trigger electrode 133 and a flash light discharge tube 134.

G is the shutter control circuit, consisting of a switch 136 so designed as to be changed over from the contact 1 to the contact 2 along with the start of the front shutter plane, a memory condenser 137 connected to the output terminal of the amplifier 107 through the switch 136 so as to store the output of the amplifier 107, an operational amplifier 138 forming a voltage follower, a logarithmically enlarging transistor 139 whose base is connected to the output terminal of the amplifier 138, a time constant condenser connected to the collector of the transistor 139, a conventional Schmitt trigger condenser 141 whose input terminal is connected to the output terminal of the condenser and a rear shutter plane control magnet 142 connected to the output terminal of the circuit 141. Hereby, 143 is the power source and 144 is the main switch. Further, the liquid crystal cell 22 and the lamp 15 are arranged in the optical system of the camera as is shown in FIGS. 3–8.

Below the operation of the embodiment shown in FIG. 9 will be explained in detail.

By closing the main switch 144, a voltage is applied to the voltage dividing circuit consisting of the resistance 102 and CdS 101, which circuit produces an output. As afore mentioned, the smallest F value of the lens is set on the resistance 102 while the light beam coming through the lens reaches CdS 101 so that the output voltage of the voltage dividing circuit assumes a value corresponding to the brightness Bv and led to the non inversing input terminal of the amplifier 107 through the buffer circuit 104. To the non inversing input terminal of the amplifier 107, the informations of the preset aperture value and of the film sensitivity set on the resistance 105 are applied so that the output of the amplifier 107 corresponds to Tv (= Bv + So − Av), so as to produce a voltage corresponding to the shutter time value for proper exposure. In consequence, the voltage corresponding to the shutter time value is transmitted to the non inversing input terminal of the amplifier 119. On the other hand the inverter D is in operative state since the main switch has been closed while an A.C. is applied to the electrodes A and B of the liquid crystal cell 22. Further, the secondary coil 124 of the inverter is connected to the base of the transistor 121 so that the transistor 121 is carrying out the closing and the opening operation in synchronization with the A.C. applied to the electrodes A and B. In consequence, the amplifier 119 also produces an A.C. signal synchronized with the above A.C., whereby the level of the A.C. signal corresponds to the shutter time value. Thus, the voltage to be applied to the C electrode of the liquid crystal cell 22 through the transformer 120 is an A.C. signal synchronized with the A.C. applied to the electrodes A and B, whereby the level corresponds to the shutter time value so that a line is displayed at the position corresponding to the shutter time value as is explained afore in connection with the display operation of the liquid crystal cell in such a manner that the shutter time value is displayed in the view finder by means of the afore mentioned optical systems. The shutter time is displayed in the view finder in this way, whereby when the brightness of the object to be photographed is too low to observe the display in the view finder the resistance value of CdS 101 is also high so that the buffer circuit 104 also produces a high voltage. Thus, the output of the buffer circuit 104 becomes higher than the level set by means of the resistances 108 and 109 so that the comparator 110 produces a high level signal, which is transmitted to the transistor 118 through the OR gate 117 in such a manner that the transistor 118 is brought into the switched on state, the lamp 15 lights up and the liquid crystal cell is illuminated by means of the light beam from the lamp through the afore mentioned optical systems, whereby the value is clearly displayed even when the photographic atmosphere is dark. Further, when the shutter time value obtained by the calculation is longer than the limit value of the hand holding, the output voltage of the amplifier 107 becomes higher than the level set by means of the resistances 111 and 112 so that the comparator 113 produces a high level signal, which is transmitted to the transistor 118 through the OR gate 117 in such a manner that the lamp 15 lights up, whereby the illumination of the liquid crystal cell is changed over from the daylight to the light beam of the lamp so that the photographer can confirm that the shutter time value is longer than the limit time for the hand holding. Normally the output corresponding to the limit time for the hand holding is produced when the brightness is low so that when the photographic atmosphere is dark, the value can be clearly displayed in the same way as in case of the low brightness.

In order to take a photograph by using a speed light device, the main switch of the speed light device circuit F is closed so as to store the flash light energy in the main condenser 128, whereby when the charge voltage of the main condenser 128 has not yet reached a value necessary for taking a photograph under flash light, the output voltage of the voltage dividing circuit consisting of the resistances 129 and 130 is also low. Thus, the comparator 116 produces a low level signal, while along with the charging of the main condenser 128 the charge voltage reaches a value sufficient enough for the flash light photography, when the output voltage of the afore mentioned voltage dividing circuit surpasses the output voltage of the voltage dividing circuit consisting of the resistances 114 and 115 so that the comparator 116 comes to produce a high level signal, which signal is transmitted to the transistor 118 through the OR gate so as to bring the transistor 118 into the switched on state and tolight up the lamp 15. In consequence, when the charging of the main condenser has been completed, the illumination of the liquid crystal cell 22 through the optical systems is changed over from the daylight to the light beam of the lamp so that the photographer can confirm that it is ready for the flash light photography. Further the photographic atmosphere is normally dark when the speed light device is to be used, whereby the shutter time value is clearly displayed in the same way as in the previous case while it is also possible to judge whether the then shutter time is suited for the flash light photography, which is very profitable. Hereby, the output terminal of the amplifier 107 is connected to the condenser 137 through the switch 136 so that the shutter time value is memorized in the condenser 137, whereby after the front shutter plane has started to run by the shutter release the switch change over from the contact 1 to the contact 2 and therefore the time constant condenser 140 is charged in accordance with the shutter time value memorized in the condenser 137 in such a manner that after the lapse of the time corresponding to the shutter time value memorized in the condenser 137 the rear shutter plane control magnet operates so as to release the rear shutter plane, the shutter time being controlled.

As mentioned above, in case of the embodiment shown in FIG. 9, not only when the brightness is low but also when the shutter time value is longer than the limit time value for the hand holding and when the speed light device has been charged, the lamp lights up while the illumination of the liquid crystal cell is changed over from the daylight to the artificial light so that not only a clear display can be obtained but also it is possible for the photographer to confirm the limit time alarm for the hand holding as well as the charge completion of the speed light device.

As mentioned above, the liquid crystal display device for a camera in accordance with the present invention is so designed that the liquid crystal cell is illuminated by the daylight and the artificial light, whereby in case of the illumination by the artificial light an even illumination of the liquid crystal cell can be obtained by means of the optical systems, while when the shutter time value is longer than the limit time value for the hand holding or when the flash light device is ready for producing a flash light the liquid crystal cell is illuminated by the artificial light so that not only a clear display can always be obtained but also the hand holding limit alarm, the flash light photography preparation state and so on can be displayed, which is remarkably profitable.

What is claimed is:
1. A device for a camera comprising
   (a) a light measuring circuit for measuring the brightness of the object to be photographed,
   (b) an information setting means for setting an exposure factor,
   (c) a calculating circuit for calculating the output of the light measuring circuit and the exposure factor set by means of the information setting means so as to obtain the shutter time value corresponding to the brightness of the object to be photographed,
   (d) a liquid crystal display means for displaying the shutter time value in accordance with the output of the calculating circuit,
   (e) an optical system for illuminating the liquid crystal display means by ambient light and to direct the display value into the view finder,
   (f) an artificial light source for illuminating the liquid crystal display means,
   (g) a signal forming circuit for detecting the output of the calculating circuit and producing a signal for operating the artificial light source when the detected output corresponds to a time longer than the limit time for a hand held photograph,
   (h) a driving means for operating the artificial light source in response to the signal from the signal forming circuit.
2. A device in accordance with claim 1 wherein the signal forming circuit includes
   a standard signal forming means for producing an output of a standard level corresponding to the limit time and
   a comparison circuit for comparing the output of the calculating circuit with the output of the standard signal forming means so as to produce an output signal when the output of the calculating circuit corresponds to a time value longer than the limit time.
3. A device in accordance with claim 1 further comprising
   a shutter control circuit for controlling the shutter time in accordance with the output of the calculating circuit.
4. A device as in claim 1, further comprising light transmitting means for receiving light from said artificial light source and for uniformly transmitting the light from the artificial light source to said liquid crystal display means.
5. A camera system comprising:
   (A) a flash light device including:
      (a) a flash light energy storing means for storing flash light energy,
      (b) a flash light means for producing a flash light with the flash light energy stored in the flash light energy storing means,
   (B) a camera including:
      (a) a light measuring circuit for measuring the brightness of the object to be photographed,
      (b) a liquid crystal display means for displaying the information corresponding to the brightness bases upon the output of the light measuring circuit,

(c) an optical system for illuminating the liquid crystal display means by means of the light from outside and to direct the display value into the view finder, (d) an artificial light source for illuminating the liquid crystal display means, (e) a signal forming circuit for producing a signal to actuate the artificial light source when the level of the energy stored in the flash energy storing means surpasses a certain determined value, by detecting the energy level, (f) a driving means for operating the artificial light source in response to the signal from the signal forming circuit.

6. A camera system in accordance with claim 5 wherein the camera includes:

a second signal forming means for detecting the output of the light measuring circuit so as to actuate the artificial light source when the output of the circuit corresponds to the brightness lower than a certain determined value, the driving means actuating the artificial light source in response to the signal from the second signal forming means.

7. A camera system in accordance with claim 6 wherein the camera includes:

(a) an information setting means for setting the exposure factor, (b) a calculating circuit for calculating the output of the light measuring circuit and the exposure factor set by means of the information setting means so as to obtain the shutter time value corresponding to the brightness of the object to be photographed, (c) a third signal forming circuit for detecting the output of the calculating circuit so as to produce a signal for operating the artificial light source when the detected output corresponds to a time longer than the limit time for a hand held photograph, the driving means actuating the artificial light source in response to the signal from the third signal forming means.

8. A device as in claim 5, further comprising light transmitting means for receiving light from said artificial light source and for uniformly transmitting the light from the artificial light source to said liquid crystal display means.

* * * * *